United States Patent
Bartlett et al.

(10) Patent No.: US 9,558,084 B2
(45) Date of Patent: *Jan. 31, 2017

(54) RECOVERY CONTROL IN MIRRORED DISKS

(71) Applicant: INTERNATIONAL BUSINESS MACHINES CORPORATION, Armonk, NY (US)

(72) Inventors: Eric J. Bartlett, Winchester (GB); Colin R. Jewell, Winchester (GB); John E. Lindley, San Jose, CA (US); William J. Scales, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/174,712

(22) Filed: Feb. 6, 2014

(65) Prior Publication Data

US 2014/0157047 A1    Jun. 5, 2014

Related U.S. Application Data

(63) Continuation of application No. 13/529,047, filed on Jun. 21, 2012, now Pat. No. 8,677,178, which is a continuation of application No. 13/125,771, filed as application No. PCT/EP2009/063678 on Oct. 19, 2009, now abandoned.

(51) Int. Cl.
  *G06F 11/00* (2006.01)
  *G06F 11/20* (2006.01)
  *G06F 3/06* (2006.01)

(52) U.S. Cl.
  CPC ......... *G06F 11/2082* (2013.01); *G06F 3/0604* (2013.01); *G06F 3/065* (2013.01); *G06F 3/0689* (2013.01); *G06F 11/2087* (2013.01)

(58) Field of Classification Search
  CPC . G06F 11/0604; G06F 11/065; G06F 11/0689; G06F 11/2064; G06F 11/2082; G06F 11/2087; G06F 11/2094
  See application file for complete search history.

(56) References Cited

U.S. PATENT DOCUMENTS

| | | |
|---|---|---|
| 5,875,444 A | 2/1999 | Hughes |
| 6,636,984 B1 | 10/2003 | McBrearty et al. |
| 7,430,646 B2 | 9/2008 | Cox et al. |
| 7,672,979 B1 | 3/2010 | Appellof et al. |
| 7,730,347 B1 | 6/2010 | Yang |

(Continued)

FOREIGN PATENT DOCUMENTS

| | | |
|---|---|---|
| CN | 1831749 A | 9/2006 |
| EP | 1686478 A2 | 8/2006 |

(Continued)

*Primary Examiner* — Marc Duncan
(74) *Attorney, Agent, or Firm* — Griffiths & Seaton PLLC (57) ABSTRACT

A method for operating a mirrored disk storage system, comprises a determiner component for determining a repair characteristic of a pair of mirrored disks, a comparator for comparing said repair characteristic of a first of said pair with said repair characteristic of a second of said pair, and a cancelling component for cancelling a repair action for said one of said first or said second of said pair that is not selected by said selector.

14 Claims, 5 Drawing Sheets

(56) References Cited

U.S. PATENT DOCUMENTS

| | | | |
|---|---|---|---|
| 8,060,776 B1 | 11/2011 | Schoenthal et al. | |
| 8,677,178 B2 * | 3/2014 | Bartlett | G06F 11/2082 714/6.23 |
| 2003/0188233 A1 * | 10/2003 | Lubbers | G06F 11/2069 714/100 |
| 2004/0205382 A1 | 10/2004 | Noda et al. | |
| 2004/0230859 A1 * | 11/2004 | Cochran | G06F 11/2058 714/2 |
| 2004/0230862 A1 * | 11/2004 | Merchant | G06F 3/0607 714/6.12 |
| 2005/0081006 A1 | 4/2005 | Shackelford et al. | |
| 2005/0086445 A1 | 4/2005 | Mizuno et al. | |
| 2006/0143497 A1 | 6/2006 | Zohar et al. | |
| 2006/0182050 A1 | 8/2006 | Dohm | |
| 2008/0168246 A1 | 7/2008 | Haustein et al. | |

FOREIGN PATENT DOCUMENTS

| | | |
|---|---|---|
| JP | 5134812 A | 6/1993 |
| JP | 2005267056 A | 9/2005 |
| JP | 2005316981 A | 11/2005 |
| JP | 2006227751 A | 8/2006 |
| JP | 2006277723 A | 10/2006 |
| JP | 2007065873 A | 3/2007 |
| JP | 2008084168 A | 4/2008 |

* cited by examiner

RECOVERY CONTROL IN MIRRORED DISKS

CROSS-REFERENCE TO RELATED APPLICATIONS

This application is a Continuation of a U.S. National-Stage entry under 35 U.S.C §371, Ser. No. 13/529,047 filed Jun. 21, 2012, which is a continuation of a U.S. National-Stage entry under 35 U.S.C §371, Ser. No. 13/125,771 filed Apr. 22, 2011, which is based on International Application No. PCT/EP2009/063678, filed Oct. 19, 2009, which was published under PCT Article 21(2) and which claims priority to European Patent Application No. 08169556.1, filed Nov. 20, 2008.

BACKGROUND OF THE INVENTION

Field of the Invention

The present invention relates to a technology for recovery control in mirrored disks, and in particular to a technology for improving recovery time of mirrored disks when read stability is in doubt.

Description of the Related Art

In storage systems an array of independent storage devices can be configured to operate as a single virtual storage device using a technology known as RAID (Redundant Array of Independent Disks—earlier known as Redundant Array of Inexpensive Disks). A computer system configured to operate with a RAID storage system is able to perform input and output (I/O) operations (such as read and write operations) on the RAID storage system as if the RAID storage system were a single storage device. A RAID storage system includes an array of independent storage devices and a RAID controller. The RAID controller provides a virtualised view of the array of independent storage devices—this means that the array of independent storage devices appear as a single virtual storage device with a sequential list of storage elements. The storage elements are commonly known as blocks of storage, and the data stored within them are known as data blocks. I/O operations are qualified with reference to one or more blocks of storage in the virtual storage device. When an I/O operation is performed on the virtual storage device the RAID controller maps the I/O operation onto the array of independent storage devices. In order to virtualise the array of storage devices and map I/O operations the RAID controller may employ standard RAID techniques that are now well known in the art.

In a non-RAID computer system, if a disk drive fails, all or part of the stored customer data may be permanently lost (or possibly partially or fully recoverable but at some expense and effort). Although backup and archiving devices and procedures may preserve all but the most recently saved data, there are certain applications in which the risk of any data loss and the time required to restore data from a backup copy is unacceptable. Therefore, RAID ("redundant array of inexpensive disks") storage subsystems are frequently used to provide improved data integrity and device fault tolerance.

Storage subsystems thus aim to provide continuous data availability and data integrity. One solution that aims to increase availability is RAID-1 which is also commonly known as mirroring. Mirroring maintains two or more copies of the data and when one copy is unavailable then the other, or another, copy is used to allow I/O to continue thus improving availability over the case where only a single copy exists and is unavailable.

To maintain the mirror each write I/O must be performed to each copy. An I/O failure could occur before all write I/Os to all copies have completed which could result in the mirror having different data on different copies. In these situations it is important that the storage system maintains read stability (which is defined to mean that every read I/O to the same area should return the same data if no intervening writes have occurred) which means that the copies must be restored to a state where they have identical data.

RAID-1 mirroring solutions typically have methods to store metadata to record writes in flight that can be used to replay write I/Os after a system failure (such as a reset). After the writes in flight have been replayed read stability is restored.

More severe system failures can mean all ability to replay writes in flight has been lost. In these situations there is no way to determine what part of the mirror copy data is identical. In these circumstances read stability can be restored by choosing any one mirror copy as a source and copying all its contents to the other target copies (commonly referred to as synchronizing the copies). This situation when the mirror read stability is in doubt is different from the case where one copy has the correct data and another copy does not contain the same data (because it could not be written to for some reason), recovery from this situation using synchronisation is provided by systems known in the art.

As soon as the source copy is available data availability can be restored as this copy has the correct data that can be read. When the source and all target copies are available and after the synchronisation process has successfully completed, read stability across the mirror copies has been restored and therefore all mirror copies are usable and mirror redundancy has been restored.

However, until the source copy is available the mirror is unavailable and the synchronisation process to restore the mirror redundancy cannot be started. This means existing solutions can take a considerable time to recover the mirror availability and its redundancy.

It would thus be desirable to have an improved technological means for recovery control in mirrored disks, and in particular to have a technology for improving recovery time of mirrored disks when read stability is in doubt.

SUMMARY OF THE INVENTION

The present invention accordingly provides, in a first aspect, an apparatus for operating a mirrored disk storage system, comprising: a detector component operable to detect that a failure has left read stability in doubt; a determiner component for determining a repair characteristic of a pair of mirrored disks; a comparator for comparing said repair characteristic of a first of said pair with said repair characteristic of a second of said pair; and a selector for selecting one of said first or said second of said pair having a preferred repair characteristic to be used as a synchronization source disk.

Said preferred repair characteristic may comprise the characteristic that no repair is required for said one of said first or said second of said pair, or that a least repair time is required for said one of said first or said second of said pair. The preferred repair characteristic may comprises the characteristic that no repair is required for said one of said first or said second of said pair and that said one of said first or said second of said pair is a space-efficient copy.

The apparatus may further comprise a cancelling component for cancelling a repair action for said one of said first or said second of said pair that is not selected by said selector.

The apparatus may further comprise a synchronizing component for synchronizing said first and said second of said pair using said one of said first or said second of said pair having a preferred repair characteristic as said synchronization source disk.

In a second aspect, there is provided a method for of operating a mirrored disk storage system, comprising the steps of: detecting that a failure has left read stability in doubt; determining a repair characteristic of at least a pair of mirrored disks; comparing said repair characteristic of a first of said pair with said repair characteristic of a second of said pair; and selecting one of said first or said second of said pair having a preferred repair characteristic to be used as a synchronization source disk.

Preferred features of the method provide steps corresponding to the actions of the components of the apparatus according to the preferred features of the first aspect.

In a third aspect, there is provided a computer program comprising computer program code to, when loaded into a computer system and executed thereon, cause said computer system to perform all the steps of a method according to the second aspect.

Preferred embodiments of the invention contemplate, in their broadest aspect, technological means for recovery control in mirrored disks, and in particular a technology for improving recovery time of mirrored disks when read stability is in doubt.

In a fourth aspect, there is provided a method for operating a mirrored disk storage system, comprises a determiner component for determining a repair characteristic of a pair of mirrored disks, a comparator for comparing said repair characteristic of a first of said pair with said repair characteristic of a second of said pair, and a cancelling component for cancelling a repair action for said one of said first or said second of said pair that is not selected by said selector.

BRIEF DESCRIPTION OF THE DRAWINGS

A preferred embodiment of the present invention will now be described, by way of example only, with reference to the accompanying figures, in which.

DETAILED DESCRIPTION OF THE DRAWINGS

The preferred embodiment of the present invention is broadly directed to a technological means for recovery control in mirrored disks, and in particular to a technology for improving recovery time of mirrored disks when read stability is in doubt.

The present invention may be implemented in configurations where the mirror copies can require their own repair and recovery operation to restore data access during system failures. This is normally associated with repairing corruption of metadata on disk that if not repaired (or rebuilt entirely) would cause data integrity problems. The repair process can require time before that copy's availability is restored. Examples include:

The mirror copy is a file system that requires a repair (such as an FSCK rebuild);

The mirror copy is a space efficient copy that requires repair; or

The mirror copy is an IBM® SAN Volume Controller (SVC) Vdisk and the SVC cluster requires Tier 3 recovery. (IBM is a Registered Trade Mark of International Business Machines, Corp. in the USA, other countries, or both)

Preferred embodiments of the present invention provide an apparatus, a method and a computer program operable to select the mirror with the best recovery time and so restore the mirror availability and redundancy in less time (i.e. with an improved recovery time) or, in an alternative, with other preferred characteristics.

Figure 1:
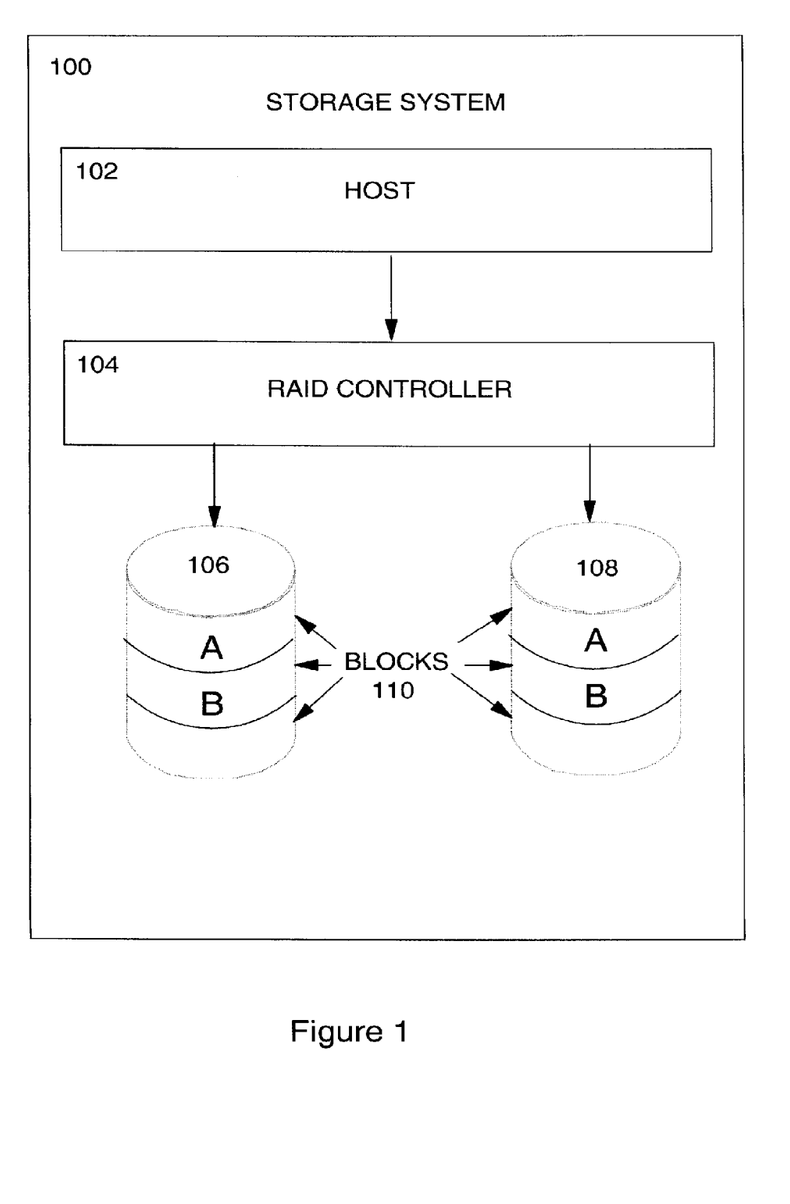
FIG. 1 shows in schematic form an apparatus or arrangement of components in an initial state in which an embodiment of the present invention may be implemented.

Turning to FIG. 1, there is shown in simplified schematic form an apparatus or arrangement of components in an initial state in which a preferred embodiment of the present invention may be implemented.

In FIG. 1, storage system 100 comprises a host 102, and a RAID controller 104. RAID controller 104 is operatively coupled to RAID storage devices 106, 108 which contain blocks of storage 110 in which data A and data B are stored in mirror image form.

Figure 2:
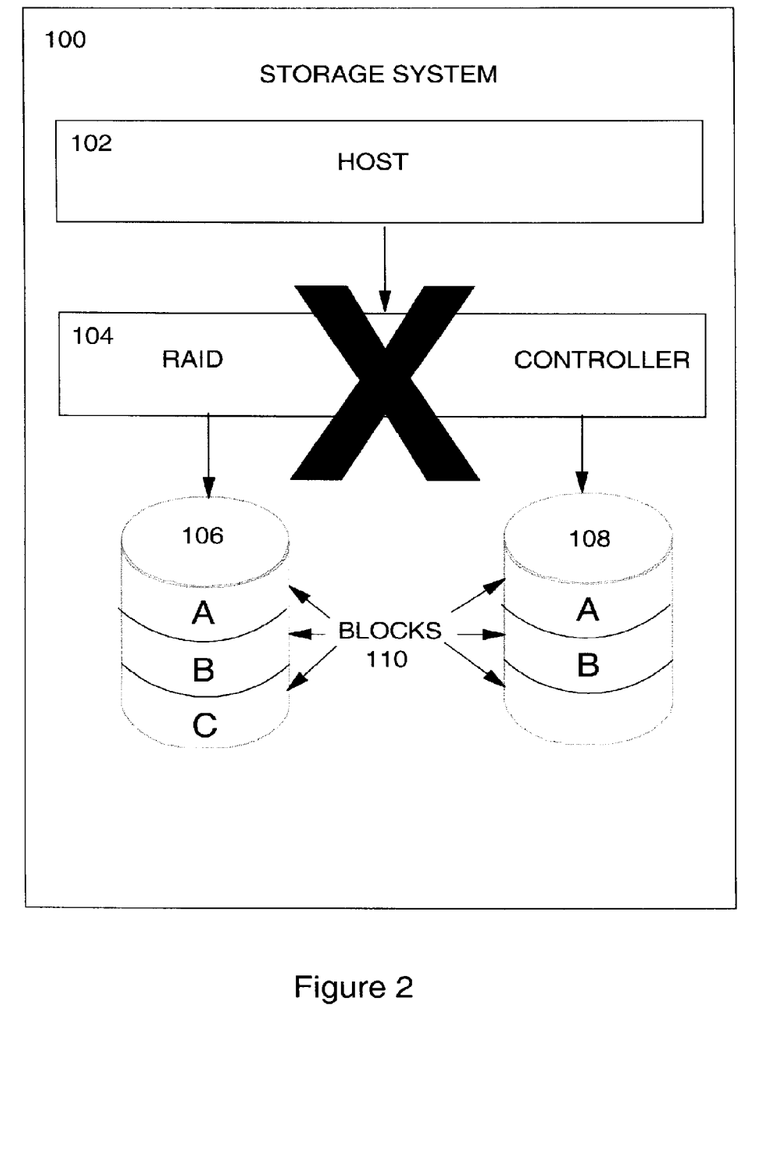
FIG. 2 shows in schematic form an apparatus or arrangement of components in an error state in which an embodiment of the present invention may be implemented.

Turning to FIG. 2, there is shown in simplified schematic form an apparatus or arrangement of components in an error state in which a preferred embodiment of the present invention may be implemented.

In FIG. 2, storage system 100 comprises a host 102, and a RAID controller 104. RAID controller 104 is operatively coupled to RAID storage devices 106,108 which contain blocks of storage 110 in which data A and data B are stored in mirror image form. However, a controller failure indicated by "X" on the RAID controller 104 means that in-flight writes are interrupted and controller metadata has been lost, such that RAID devices 106, 108 are no longer correctly mirroring data, and thus read stability will not exist on the system when RAID storage devices 106, 108 are re-established as a mirrored pair.

It is not clear on reestablishment which image would provide the correct data in response to a read command, as data C could, for example, appear on RAID storage device 106 as a result of having been correctly written on RAID storage device 106 but not mirrored on RAID storage device 108, or as a result of having been correctly mirrored but subsequently deleted from RAID storage device 108 where the matching delete has not succeeded on RAID storage device 106.

As will be clear to one of ordinary skill in the art, the arrangement and location of devices, systems or modules shown in the figures is intended to be exemplary only, and many other arrangements are envisaged, as for example, locating devices at intermediate and communicating nodes of a data processing or communications network. Such alternative arrangements of devices, systems or modules are well understood by those of ordinary skill in the art, and need not be further described here. Further, it will be clear to one of ordinary skill in the art that the system depicted in the figures has been much simplified in order to display the storage system of an embodiment of the present invention, and that "real-life" systems will in many cases be of considerably greater complexity. The advantageous nature of the embodiments of the present invention will be clearly seen by one of skill in the art to inhere in the more complex arrangements as in the simple arrangement depicted herein.

The general method of operation for mirrors that have their read stability in doubt may be represented in pseudo-code as follows:

```
set repair action time / ranking to a max value
for each mirror copy
{
        if mirror copy requires repair action
        {
                if this copy's repair action time / ranking is lower than
                recorded time / ranking
                {
                        record mirror copy as source copy
record this copy's repair action time / ranking as the recorded time /
ranking
                }
        }
        else
        {
                record mirror copy as source copy
                exit for each mirror copy loop (i.e. always use first copy
                that does not require repair as source copy)
        }
}
for each mirror copy
{
        if mirror copy requires repair action AND it is not the selected
        source copy
        {
                cancel / abort the copy repair action
        }
}
perform synchronisation from source copy to all target copies (by reading
data from source copy and writing to target copies).
```

Figure 3:
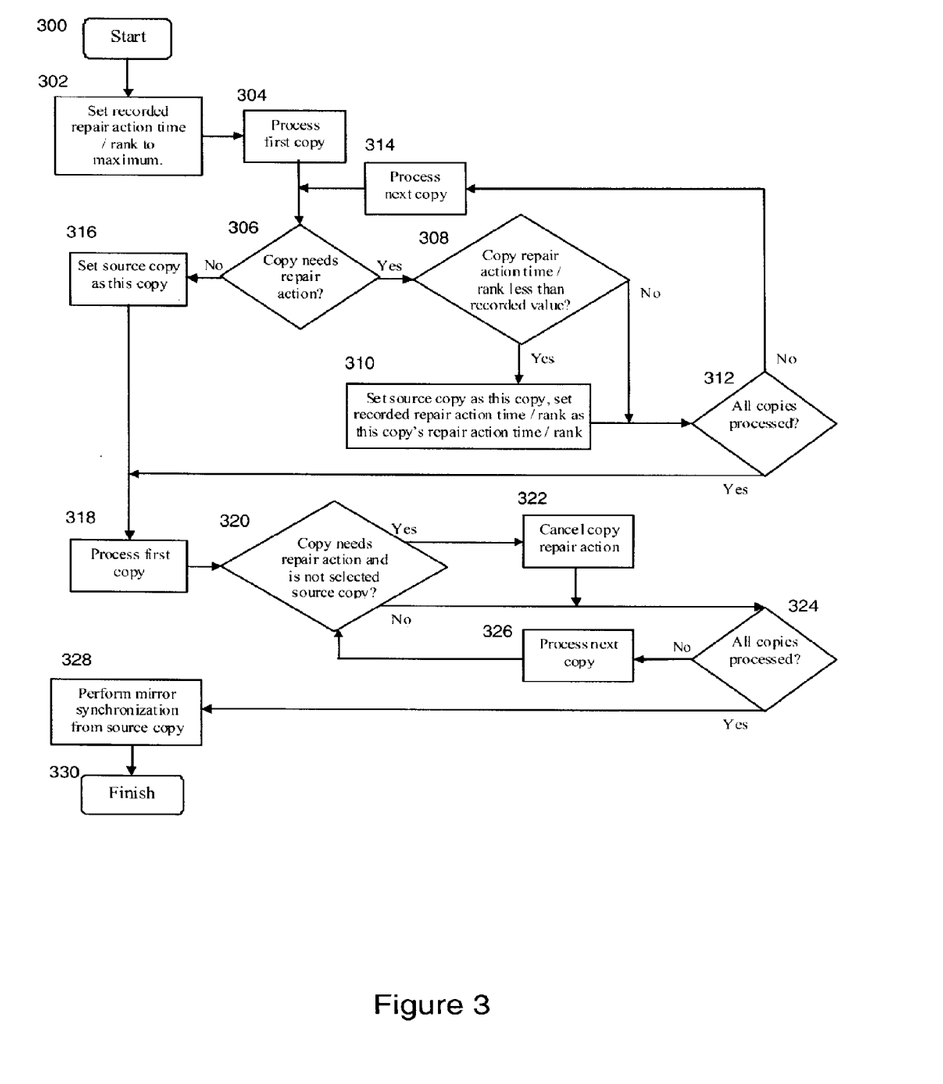
FIG. 3 shows in flowchart form one method or one logic arrangement for operating an apparatus or arrangement of components to perform recovery control in mirrored disks according to a general embodiment of the invention.

FIG. 3 shows in a corresponding flowchart form a very simplified representation of one method or one logic arrangement for operating an apparatus or arrangement of components to achieve improved technological means for recovery control in mirrored disks according to a general embodiment of the invention.

In FIG. 3, after START step 300, the recorded value for repair time or rank is set to a maximum value determined according to parameters of the system, which, as will be clear to one of ordinary skill in the art, may vary. At step 304 the first copy is taken for processing. At test step 306, it is determined whether the copy needs any repair action. If the determination is negative, the first copy is set as the source copy for processing at step 318 and the following steps. If the determination at test step 306 is positive, the copy repair time is compared at test step 308 with the recorded value. If the determination at test step 308 is positive, the copy is set as source copy and the recorded value is set to the repair time or rank value of this copy and control passes to test step 312. If, the determination at test step 308 is negative, control passes directly to test step 312. At test step 312, a determination is made whether all copies have been processed, and if the determination is negative, the next copy is taken for processing at step 314, after which the process repeats from test step 306. If the determination at test step 312 is positive, control passes to step 318. At step 318, the first copy is taken for processing and control passes to test step 320. Test step 320 determines whether the copy needs a repair action and is not the selected source. If the determination is positive, the copy repair action for the copy is cancelled at step 322 and control passes to test step 324. Test step 324 determines if all copies have been processed. If the determination is negative, the next copy is taken for processing at step 326 and control returns to test step 320 for the next copy. If the determination at test step 324 is positive, all copies have been processed, a source copy has been selected and control passes to step 328. At step 328, mirror synchronization is performed using the selected source copy when it and the target copy or copies come back online on completion of any scheduled repair actions. At step 330, the process finishes.

The core idea of each of the embodiments is to use knowledge of the mirror copy repair characteristics to decide which is the best copy to use as the source for the mirror synchronisation from a recovery time viewpoint (or, in an alternative, with other preferred characteristics). The required information for each copy according to the basic embodiment is:

Does copy need a repair action before it will be available again?

What is the expected repair time of the repair action? This can be an explicit time value in seconds; or can be a relative value based on knowledge of copy configuration repair times that can be ranked (with quickest repair time first).

By selecting the mirror copy that has the smallest repair time or rank, the recovery time to restore availability can be minimized to the recovery time of the source copy repair action (if no source copy repair action is required, the recovery time becomes 0—that is, availability is restored immediately).

In addition a mechanism can be used to cancel the mirror copy repair action for copies that are not the source. This mechanism notifies the copy storage engine that its data is no longer needed (as it will all be rewritten by the mirror synchronisation) and so its repair action can be cancelled. This means the time to synchronize the target copy(s) and restore the mirror redundancy has been reduced by the time the target copy repair actions would have taken (as the synchronisation cannot start before the repair actions complete and the copies became available again).

Embodiments of the present invention include:

For hybrid mirrors with both Space Efficient and Fully Allocated copies, select the source copy to preserve space efficiency—this is important if the Space Efficient system does not support zero detection, as using the Fully Allocated copy as the source will lead to the Space Efficient copy becoming fully allocated. The concepts of Space Efficient and Fully Allocated copies are well known in the art and need not be further described here.

Use mirror synchronisation as an alternative to the copy repair mechanism when a mirror is healthy—this helps to improve system redundancy recovery time when a synchronisation from another copy would be quicker than the copy repair.

Some advantages of the preferred and alternative embodiments of the present invention over the prior art techniques are:

When mirror read stability is in doubt and full synchronisation is needed and mirror copies have different repair times—there is a decreased recovery time for mirror availability;

When mirror read stability is in doubt and full synchronisation is and mirror copies have different repair times—there is a decreased recovery time for mirror redundancy;

When mirror read stability is in doubt and full synchronisation is needed—it is made possible to maintain space efficiency for space efficient implementations that do not implement zero detection; and When mirror copies are all identical and synchronisation would be quicker than a required copy repair action—there is a decreased recovery time for mirror redundancy.

For an alternative embodiment to be implemented, the following information is also required:

Is the copy Space Efficient?

In a most preferred embodiment, each mirror copy records information in respect of each of the following questions:

Is the copy space efficient (and not fully allocated)?

Does the space efficient copy require repair?

The most preferred implementation of the present invention then ranks the repair times of different copy configurations as follows:

0=fully allocated copies or space efficient copies that do not require a repair action 1=space efficient copies that require a repair action Rank 0 is selected over rank 1.

In a further refinement, a modification of the basics system and method described above can be used to maintain space efficiency for hybrid mirrors where the space efficient implementation does not support zero detection.

This further refined mirror read-stability-in-doubt source-copy selection method can be represented as:

```
for each mirror copy
{
    if mirror copy is space efficient
    {
        if mirror copy requires repair action
        {
            if source copy is already selected
            {
                do nothing (i.e. do not select space efficient copy that
                requires repair over a non space efficient copy that
                is fully allocated)
            }
            else
            {
                record mirror copy as source copy
            }
        }
        else
        {
            record mirror copy as source copy
            exit for each mirror copy loop (i.e. always use space
            efficient copy that does not require repair as source copy)
        }
    }
    else
    {
        record mirror copy as source copy
    }
}
for each mirror copy
{
    if mirror copy is space efficient AND requires repair
    action AND it is not the selected source copy
    {
        cancel / abort the space efficient copy repair action
    }
}
perform synchronisation from source copy to all target copies (by reading
data from source copy and writing to target copies).
```

Figure 4:
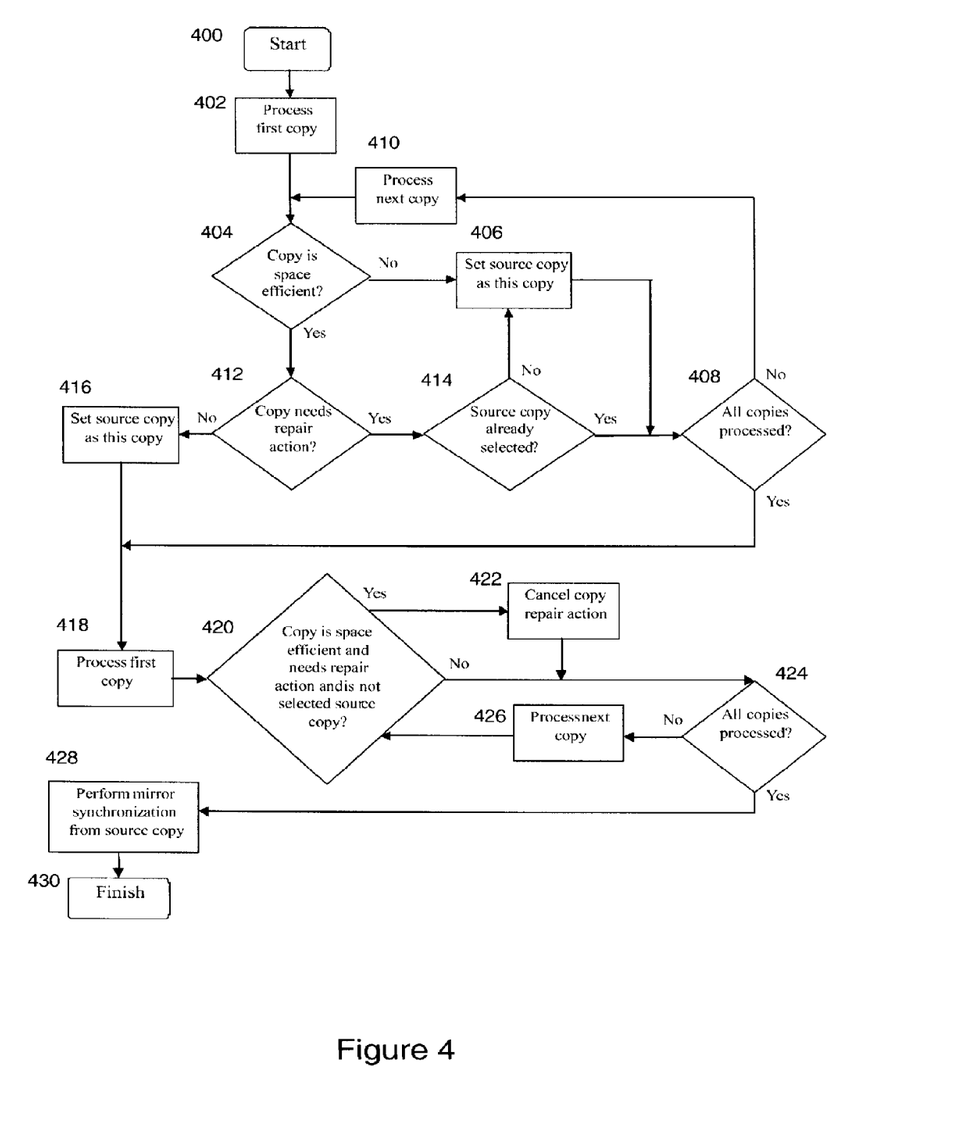
FIG. 4 shows in flowchart form one alternative method or one logic arrangement for operating an apparatus or arrangement of components to achieve a further refined technological means for recovery control in mirrored disks according to a further embodiment of the invention.

FIG. 4 shows in corresponding flowchart form this alternative method or logic arrangement for operating an apparatus or arrangement of components to achieve a further refined technological means for recovery control in mirrored disks according to a further embodiment of the invention.

In FIG. 4, following start step 400, at step 402 the first copy is taken for processing. At test step 404 the copy is tested to determine if it is a space-efficient copy. If the determination is negative, the copy is set as the source copy and control passes to test step 408. If the determination is positive, control passes to test step 412. Test step 412 determines whether this copy needs a repair action, and if the determination is negative, sets this copy as the source copy at step 416, before proceeding to process step 418. If the determination at test step 412 is positive, control passes to test step 414. Test step 414 determines whether a source copy has already been selected. If no source copy has been selected yet, control passes to step 406, where this copy is set as the source copy and control passes to test step 408. If test step 414 determines that a source copy has already been selected, control passes directly to test step 408. Test step 408 tests whether all copies have been processed, and if the determination is positive, passes control to process step 418. If the determination at test step 408 is negative, control passes to step 410 at which the next copy is taken for processing and control passes to test step 404 to begin the next iteration. When all iterations are completed, as determined by test step 408 described above, control passes to process step 418. At step 418, the first copy is taken for processing and control passes to test step 420. Test step 420 determines whether the copy is space efficient, needs a repair action and is not the selected source. If the determination is positive, the copy repair action for the copy is cancelled at step 422 and control passes to test step 424. Test step 424 determines if all copies have been processed. If the determination is negative, the next copy is taken for processing at step 426 and control returns to test step 420 for the next copy. If the determination at test step 424 is positive, all copies have been processed, a source copy has thus been selected and control passes to step 428. At step 428, mirror synchronization is performed using the selected source copy when it and the target copy or copies come back online on completion of any scheduled repair actions. At step 430, the process finishes.

Figure 5:
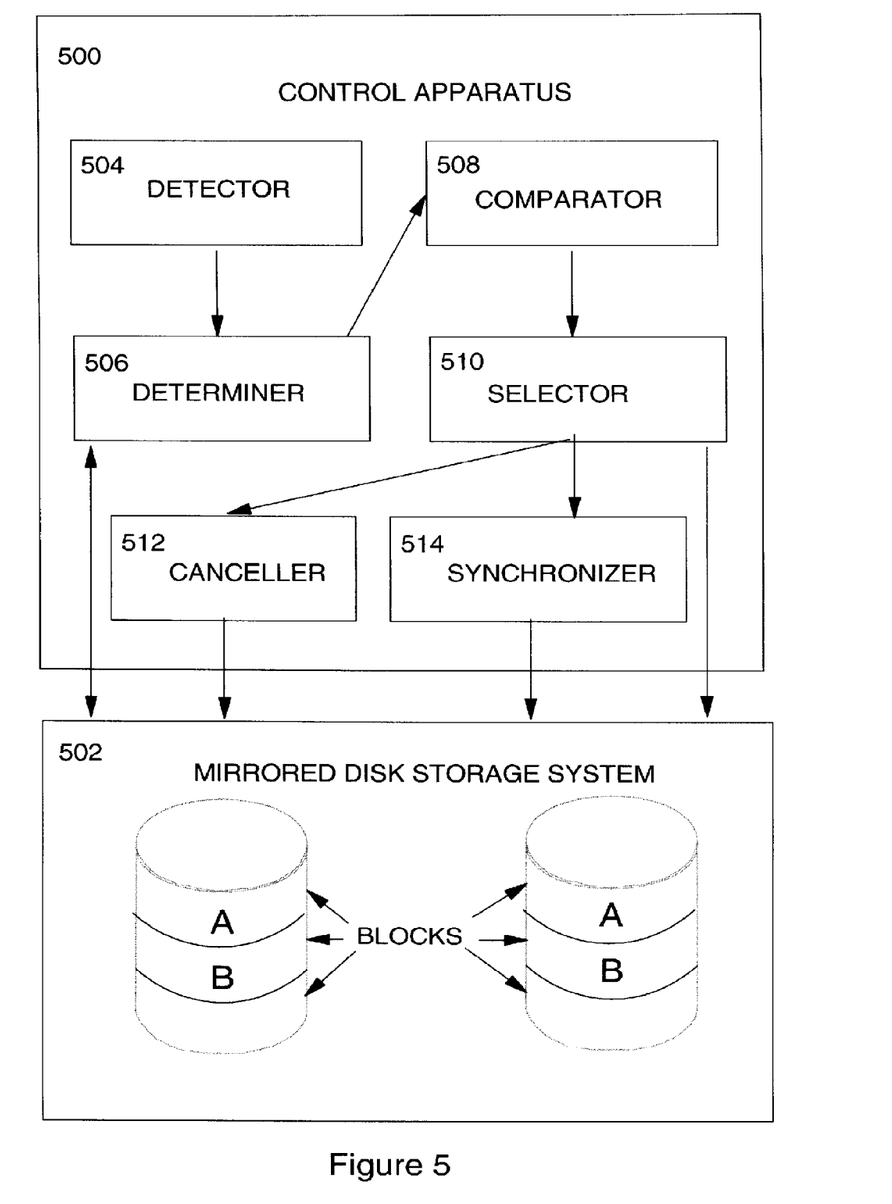
FIG. 5 shows in simplified schematic form an apparatus or arrangement of components adapted to perform the steps of a method according to a preferred embodiment of the present invention.

As will be clear to one of ordinary skill in the art, a hardware implementation of the present invention may be provided, as shown in a simplified schematic form in FIG. 5. In FIG. 5 is shown an apparatus 500 adapted to operate a mirrored disk storage system 502, comprising a detector component 504 operable to detect that a failure has left read stability in doubt. Determiner component 506 is operable to determine a repair characteristic of at least a pair of mirrored disks (for example, in the simplest case, the repair time for each disk). Comparator 508 is operable to compare the repair characteristic of the first of the pair of disks with the repair characteristic of the second of the pair of disks. Selector 510 is operable to select the one of the first or second of the pair having a preferred repair characteristic (for example, the shortest repair time) to act as the source disk for the mirror synchronization after it has been repaired. Canceller 512 is operable to cancel any repair actions for the copy or copies that have not been selected as source copy. Synchronizer 514 performs the mirror synchronization after the copy that was selected as the source copy has undergone any required repair actions.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method of operating a mirrored disk storage system, comprising the steps of:
   determining a repair characteristic of at least a pair of mirrored disks;
   comparing said repair characteristic of a first of said pair with said repair characteristic of a second of said pair; and
   cancelling a repair action for said one of said first or said second of said pair that is not selected by a selector.

2. The method of claim 1, further including selecting one of said first or said second of said pair having a preferred repair characteristic to be used as a synchronization source disk, wherein said preferred repair characteristic comprises a characteristic that no repair is required for said one of said first or said second of said pair.

3. The method of claim 2, wherein said preferred repair characteristic comprises a characteristic that a least repair time is required for said one of said first or said second of said pair.

4. The method of claim 3, wherein said preferred repair characteristic comprises a characteristic that no repair is required for said one of said first or said second of said pair and that said one of said first or said second of said pair is a space-efficient copy.

5. The method of claim 1, further including detecting that a failure has left read stability in doubt.

6. The method of claim 1, further comprising a step of synchronizing said first and said second of said pair using said one of said first or said second of said pair having a preferred repair characteristic as said synchronization source disk.

7. An apparatus for operating a mirrored disk storage system, comprising:
   a determiner component for determining a repair characteristic of a pair of mirrored disks;
   a comparator for comparing said repair characteristic of a first of said pair with said repair characteristic of a second of said pair; and
   a cancelling component for cancelling a repair action for said one of said first or said second of said pair that is not selected by a selector.

8. The apparatus as claimed in claim 7, further comprising a preferred repair characteristic comprising a characteristic that a least repair time is required for said one of said first or said second of said pair.

9. The apparatus as claimed in claim 8, wherein said preferred repair characteristic comprises a characteristic that no repair is required for said one of said first or said second of said pair and that said one of said first or said second of said pair is a space-efficient copy.

10. The apparatus as claimed in claim 7, further comprising a synchronizing component for synchronizing said first and said second of said pair using said one of said first or said second of said pair having a preferred repair characteristic as a synchronization source disk.

11. A physical computer non-transitory storage medium comprising a computer program product method for operating a mirrored disk storage system, the physical computer non-transitory storage medium comprising:
   computer code for determining a repair characteristic of at least a pair of mirrored disks;
   computer code for comparing said repair characteristic of a first of said pair with said repair characteristic of a second of said pair; and
   computer code for cancelling a repair action for said one of said first or said second of said pair that is not selected by a selector.

12. The physical computer non-transitory storage medium of claim 11, further comprising a preferred repair characteristic comprising a characteristic that a least repair time is required for said one of said first or said second of said pair.

13. The physical computer non-transitory storage medium of claim 12, wherein said preferred repair characteristic comprises a characteristic that no repair is required for said one of said first or said second of said pair and that said one of said first or said second of said pair is a space-efficient copy.

14. The physical computer non-transitory storage medium of claim 11, further comprising computer code for synchronizing said first and said second of said pair using said one of said first or said second of said pair having a preferred repair characteristic as a synchronization source disk.

* * * * *